US005294470A

United States Patent [19]

Ewan

[11] Patent Number: 5,294,470

[45] Date of Patent: Mar. 15, 1994

[54] TAMPER INDICATING CONTAINERS AND SEALS

[76] Inventor: Frederick R. Ewan, 145 Spinnaker Way, Neptune, N.J. 07753

[21] Appl. No.: 929,478

[22] Filed: Aug. 17, 1992

Related U.S. Application Data

[60] Continuation of Ser. No. 662,446, Dec. 12, 1990, abandoned, which is a division of Ser. No. 334,084, Mar. 31, 1989, Pat. No. 4,998,666, which is a continuation-in-part of Ser. No. 193,799, May 13, 1988, abandoned.

[51] Int. Cl.[5] .................... B65D 41/00; B42D 15/00; B32B 7/12

[52] U.S. Cl. .................... 428/40; 428/46; 428/203; 428/204; 428/205; 428/343; 428/352; 428/354; 428/915; 428/916; 229/102

[58] Field of Search .................... 428/916, 915, 40, 46, 428/203, 204, 205, 343, 352, 354; 229/102

[56] References Cited

U.S. PATENT DOCUMENTS 1,003,443 9/1911 Erickson .
2,181,252 11/1939 Vogel .................... 229/80
3,487,567 1/1970 Waybright .................... 40/22
3,631,617 1/1972 Pekko .................... 40/2.2
3,802,724 4/1974 Gosnell .................... 283/9
3,864,855 2/1975 Pekko et al. .................... 40/2 R
3,891,242 6/1975 Arnold et al. .................... 283/6
3,923,198 12/1975 Brochman .................... 220/359
3,925,584 12/1975 Suzuki et al. .................... 428/40
3,933,304 1/1976 Judd .................... 229/62
3,935,960 2/1976 Cornell .................... 220/260
4,028,165 6/1977 Rosenfeld .................... 156/234
4,082,873 4/1978 Williams .................... 428/40
4,121,003 10/1978 Williams .................... 428/40
4,180,929 1/1980 Schultz, Jr. .................... 40/2.2
4,184,701 1/1980 Franklin et al. .................... 283/9 R
4,246,307 1/1981 Trautwein .................... 428/43
4,475,661 10/1984 Griffin .................... 215/366
4,505,399 3/1985 Weiner .................... 215/230
4,557,505 12/1985 Schaefer et al. .................... 283/81
4,608,288 8/1986 Spindler .................... 428/78
4,627,642 12/1986 Peronneau et al. .................... 283/92
4,652,473 3/1987 Han .................... 428/35
4,709,396 11/1987 Voshall et al. .................... 383/5
4,709,397 11/1987 Voshall et al. .................... 383/5
4,718,553 1/1988 Adamoli et al. .................... 206/459
4,721,217 1/1988 Phillips et al. .................... 215/230
4,721,638 1/1988 Matsuguchi et al. .................... 428/40
4,746,556 5/1988 Matsuguchi et al. .................... 428/40
4,759,968 7/1988 Janssen .................... 428/204 X
4,763,931 8/1988 Matsuguchi et al. .................... 283/108
4,804,096 2/1989 Harding .................... 215/228
4,837,061 6/1989 Smits et al. .................... 428/40
4,838,708 6/1989 Holcomb et al. .................... 383/5
4,841,652 6/1989 Sakashita et al. .................... 428/915 X
4,876,123 10/1989 Rivera et al. .................... 428/916 X
4,916,007 4/1990 Manning et al. .................... 428/204 X
4,937,040 6/1990 Holcomb ett al. .................... 383/5
4,998,666 3/1991 Ewan .................... 206/459 X
5,060,848 10/1991 Ewan .................... 206/459 X

FOREIGN PATENT DOCUMENTS 2173150 10/1986 United Kingdom .

*Primary Examiner*—Daniel Zirker
*Attorney, Agent, or Firm*—Mathews, Woodbridge & Collins

[57] ABSTRACT

A seal comprising a substrate which is at least translucent to light having a transparent masking material disposed in an indicia-defining pattern on the inner surface of the substrate. A colorant layer is disposed over the masking material and extends beyond the pattern. There is an adhesive disposed at least over the area of the colorant. The present invention also includes a tamper indicating opaque container such as an envelope or carton has a window defined within the closure flap. A translucent or transparent panel overlaying the window has a transparent masking material of low adhesion properties disposed in an indicia-defining pattern. A colorant layer is disposed over the transparent masking material and an adhesive in turn is disposed over the colorant layer and transparent masking material. Upon unsealing of the closure flap, the adhesive dislodges the colorant from the panel within the area of the indicia-defining pattern defined by said masking material with the dislodged material remaining on the container, forming two tamper indicating indicia.

10 Claims, 7 Drawing Sheets

TAMPER INDICATING CONTAINERS AND SEALS

This is a continuation of Ser. No. 07/662,446 filed Dec. 12, 1990, now abandoned, which is a divisional of Ser. No. 07/334,084, filed Mar. 31, 1989, now U.S. Pat. No. 4,998,666, which is a continuation-in-part of Ser. No. 07/193,799 filed May 13, 1988, now abandoned; Ser. No. 07/537,327 filed Jun. 13, 1990, now U.S. Pat. No. 5,060,848, is a related divisional of Ser. No. 334,084.

BACKGROUND OF THE INVENTION

A variety of devices designed to reflect unauthorized tampering have been described previously. A number of proposals for tamper-proof labels, for example, which are designed for attachment to other objects, have been described.

U.S. Pat. No. 1,003,443 to Erickson discloses a stamp or label having complementing films, one of which adheres to a receiving surface to discourage second use of the stamp or label.

U.S. Pat. No. 3,487,567 to Waybright discloses an emblem or label for a vehicular window having an adhesive on one side of a transparent sheet and an indicia on the other, with an opaque layer carrying special indicia affixed to the transparent sheet.

U.S. Pat. No. 3,631,617 to Pekko discloses a tamper-proof label having a transparent self-supporting film which is imprinted with a first visual indicia. There is a masking surface which is in contact with at least part of the surface of the transparent substrate. The masking surface is imprinted with a visual indicia. An adhesive layer is applied having a first surface in contact with the substrate and the masking surface, the second surface of the adhesive layer contacting a substrate. It is a goal of the label of this patent to provide a visual imprinting when the label is sealed in place. When the label is applied to a substrate and thereafter removed, a portion of the indicia remains on the substrate and a portion is removed with the film.

U.S. Pat. No. 4,082,873 to Williams discloses switch-proof laminated labels having a transparent plastic film on which an indicia is imprinted in reverse and which is coated with an adhesive. The printing has a greater affinity for the adhesive than the film so that when mounted on an object and then removed, a tamper indicating amount of the printing remains on the object.

U.S. Pat. No. 4,180,929 to Schultz discloses tamper indicating multilaminate labels having two sets of indicia, one of which is rendered visible upon tampering and a second which is visible regardless of tampering.

U.S. Pat. No. 4,608,288 to Spindler discloses tamper proof labels having an irreversibly stretchable cover foil adhesively joined to a base foil with varying degrees of adhesion.

A number of references also describe tamper indicating tapes which are applied to containers and provide means indicating when the seal has been broken.

U.S. Pat. No. 3,923,198 to Brochman discloses a tape which opacifies when stressed.

U.S. Pat. No. 3,935,960 to Cornell discloses a tamper indicating tape having encapsulated dye in a binder material.

U.S. Pat. No. 4,557,505 to Schafer discloses a tape which opacifies when stressed and which carries contrasting colored indicia.

U.S. Pat. No. 4,652,473 to Han discloses a tape of two different materials which is heat shrunk onto a container.

Such tapes and labels must be applied to the outside of containers in a separate step. Moreover, these devices can be removed in the course of intentional tampering and the tampering indicia then covered, as with opaque tape, so to conceal the evidence of tampering. Various attempts have been made to incorporate tamper indicating means into the actual product so as to eliminate the need for affixing a label or tape.

U.S. Pat. No. 2,181,252 to Vogel discloses a safety envelope having two flaps, one of which carries a printing in ink which is soluble in the same solvents as is the envelope adhesive.

U.S. Pat. No. 3,933,304 to Judd discloses bags for bank notes which are heat sealed at a position adjacent to an area of printing so that the bags cannot be opened without mutilating the printing.

U.S. Pat. No. 4,505,399 to Weiner discloses a closure which includes a material sensitive to ambient conditions such as light or oxygen.

U.S. Pat. No. 4,718,553 to Adamoti discloses tamper evident packaging for cartons in which a transparent film overwraps the carton and is secured to ink on the carton in selected different patterns.

U.S. Pat. No. 4,721,217 to Phillips discloses a cap having a pair of layers providing a color shift which is destroyed or modified when the layers are separated.

U.S. Pat. Nos. 4,709,396 and 4,709,397 to Voshall disclose a tamper evident envelope in which a pressure sensitive seal along one edge contains a hidden message. Two cohesive layers, one continuous and the other non-continuous, are employed with the latter creating voids appearing as reverse drop-out patterns when the two cohesive layers are separated.

These devices generally involve either complicated manufacturing steps or utilize relatively expensive materials. This is particularly true for devices in which the tamper-indicating means are incorporated into the actual product. Devices such as those disclosed by Voshall in U.S. Pat. Nos. 4,709,396 and 4,709,397, for example, require two cohesive layers which must be separated prior to use, as well as inner paper liners to conceal the contents of the package since the outer sheet must be transparent to reveal the tampering indicia. In addition, many tamper indicating devices, particularly tapes, so complicate the overall packaging that the intended user may encounter difficulty simply trying to open the package, often a serious problem with the elderly.

SUMMARY OF THE INVENTION

The present invention is a seal comprising a substrate preferably being translucent or transparent to light, having an outer surface and an inner surface. A transparent masking material is disposed in an indicia-defining pattern on the inner surface of the substrate. The masking material possesses low adhesion properties to the material of said substrate. A colorant layer is disposed on the inner surface of the substrate over the transparent masking material and can extend beyond the indicia-defining pattern of the masking material. An adhesive is disposed over at least the area in which the colorant layer and transparent masking material are disposed.

The present invention also includes an opaque container comprising a body portion and at least one integrated sealable closure flap. The closure flap has an exposed outer surface and a sealable inner surface. A window portion is defined within an area of at least one outer closure flap. The window portion registering with a surface of the container upon closure of said flap.

There is a translucent or transparent panel overlaying the window portion and being affixed across at least a portion of its perimeter to a surface of the closure flap. The panel has an outer surf ace and an inner surface and possesses surface dimensions greater than those of the window portion such as to define a perimeter portion extending beyond the edges of the window portion.

A transparent masking material is disposed (i) in an indicia-defining pattern (ii) on the inner surface of the translucent or transparent panel opposite the exposed outer surface of said closure f lap and (iii) within an area registering with said window portion. The masking material possesses low adhesion properties to the material of said translucent or transparent panel.

A colorant layer is disposed on the inner surface of the translucent or transparent panel over the transparent masking material and extending beyond the indicia-defining pattern of the masking material.

An adhesive is disposed over at least the area in which said colorant layer and transparent masking material are disposed. The adhesive is registered with a surface of the container upon closure of said flap and operable upon unsealing cf said flap to dislodge said colorant from said panel within the area of the indicia-defining pattern defined by said masking material.

The present invention results in a sealed article whether in the embodiment of a seal or a tamper proof container. The substrate layer has relatively greater adhesion to colorant layer than the masking layer. When the substrate layer is lifted, the unmasked colorant layer is removed with the substrate leaving the masking material and colorant layer beneath the masking material on the article sealed. The translucent or transparent substrate prevents the seal from substrate from being replaced in its original condition. The seal irreversibly indicates when it is opened. The seal is not apparently tamper proof to the observer.

DETAILED DESCRIPTION

Figure 1:
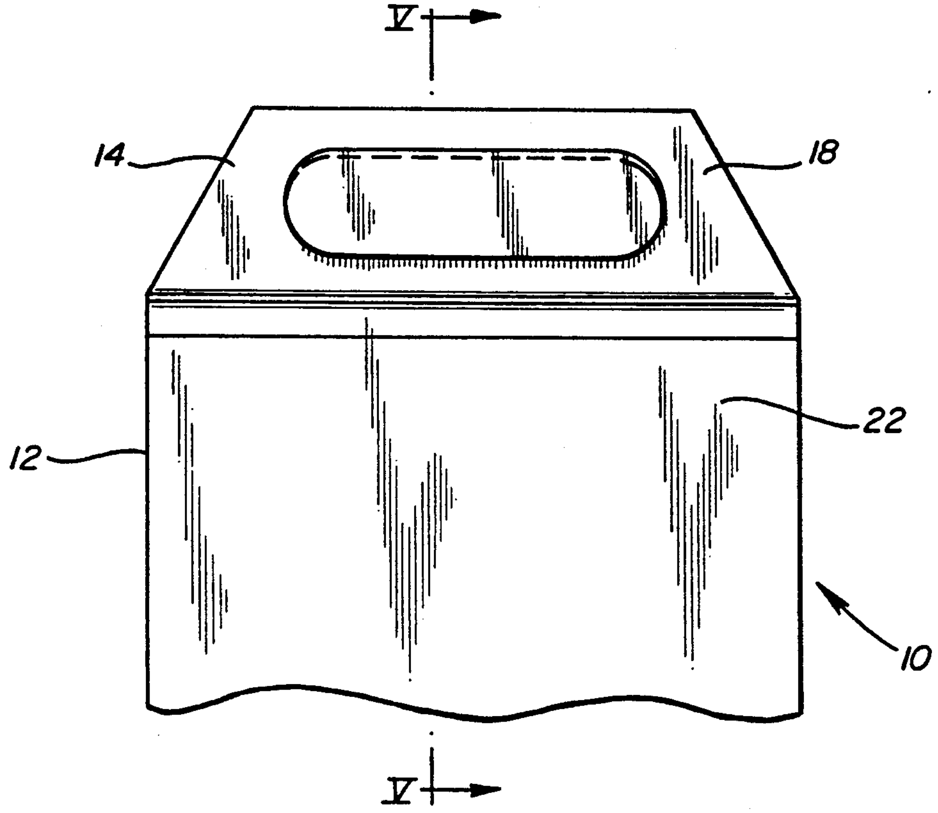
FIG. 1 is a partial plan view of a container of the envelope type prior to sealing.

The present invention pertains to tamper-indicating containers and seals of simplified design and reduced cost. The tamper-indicating device is incorporated into the container itself and requires no additional packaging, thereby rendering the package easily opened by the intended user while irreversibly displaying the tampering indicia, should such tampering have occurred, whether the container is opened or closed. Moreover, the device permits the use of opaque materials. The nature of the invention will become more apparent from the following description and the accompanying drawings.

Referring now to FIGS. 1–8, opaque container 10 has a body portion 12 and at least one integrated sealable closure flap 14. While the invention is illustrated here with respect to an envelope, it is equally useful in other container types, such as folding cartons, corrugated boxes having integrated sealable closure flaps, conventional box packaging, and the like, as shown for example in FIGS. 9 and 10. The container can be constructed of conventional materials such as paper, paperboard, corrugated paper, flexible plastic, as for example spunbonded polyethylene such as is sold by Dupont under the trademark Tyvek, and the like.

Closure flap 14, which ideally is opaque, has an exposed outer surf ace 16 and a sealable inner surface 18. Defined within an area of closure flap 14 is a window portion 20, here an aperture. Window 20 is positioned within closure flap 14 so as to register with a sealable surface 22 of container 10 upon closure of flap 14. Its dimensions are largely a matter of choice although it should not be so large as to distort or substantially weaken flap 14 nor so small as to permit entry into the container without involvement of the area occupied by the window.

Extending beyond the edges of window 20 is panel 24. Panel 24 can be fabricated from conventional materials such as films of polyester, polyethylene, polypropylene, copolymers thereof, and the like. For reasons discussed below, it can be fully transparent but is preferably translucent. It can be provided with a matte or similar dull finish to be translucent, particularly if the material used is normally transparent.

Panel 24 is cut in surface dimensions greater than those of window 20 so that it can overlay window 20 and thereby define a perimeter portion 26 extending beyond the edges of window 20. Panel 24 has an outer surface 28 and an inner surface 30 and is affixed, as with an adhesive (not shown) having a strong affinity for both the panel and the material of the flap, across at least a portion of its outer surface 28 in perimeter portion 26 to inner surface 18 of closure flap 14. Alternatively, the panel can be affixed to the window by welding, stitching, or equivalent means.

Disposed in an indicia-defining pattern on inner surface 30 of panel 24 and within an area registering with window 20 is transparent masking material 32. Masking material 32 possesses low adhesion properties to the material of translucent panel 24, as for example a silicone oil. It can be applied flexographically or printed by offset or letterpress techniques in an indicia-defining pattern corresponding to appropriate symbols or words such as "VOID" or "OPENED" in mirror image.

A colorant layer 34 is disposed on inner surface 30 of panel 24 over and extending beyond the indicia-defining pattern defined by masking material 32. The colorant layer can be an ink formulation, the composition of which will depend upon the composition of panel 24. Thus if panel 24 is fabricated from polyester, the colorant can be a nitrocellulose or acrylic ink.

In the embodiment shown in FIGS. 5, 6, 7, and 8, a primer layer 36 is disposed between masking material 32 and colorant layer 34 in an area at least coextensive with the area in which colorant layer 34 is disposed. Primer layer 36 facilitates adhesion of colorant layer 34 to panel 24 in those areas in which masking material 32 is not present. When the colorant material has a high affinity for the material of panel 24, primer layer 36 is not always needed and can be eliminated.

Figure 6:
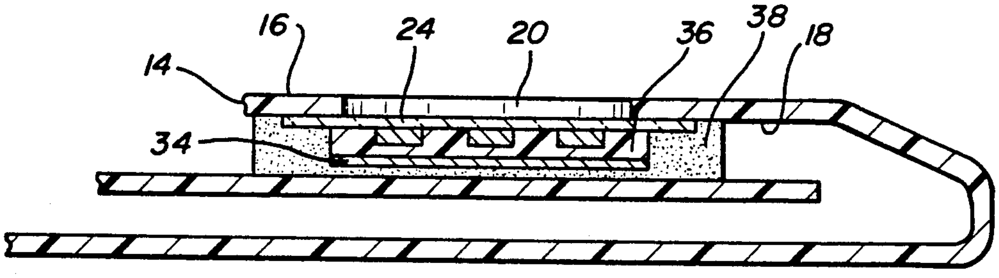
FIG. 6 is a vertical section view taken along line VI—VI of FIG. 2.
Figure 7:
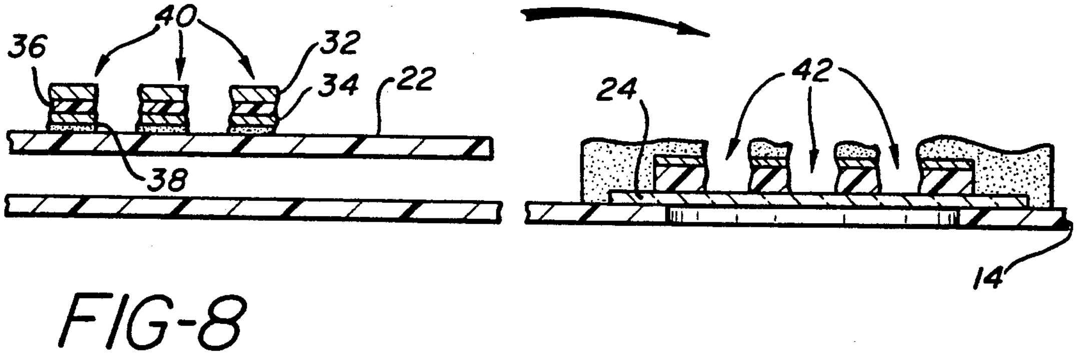
FIG. 7 is a vertical section view taken along line VII—VII of FIG. 3.

Adhesive 38 is disposed over at least a portion of inner surface 18 of closure flap 14. The portion over which adhesive 38 is disposed will include at least the area in which colorant layer 34 and transparent masking material 32 are disposed. Adhesive 38 is operable first to seal closure flap 14 to a sealable surface 22 of container 10 upon closure of flap 14 as shown in FIG. 6. In addition, upon subsequent unsealing of flap 14 as shown in FIG. 7, adhesive 38 dislodges portions 40 of the composite including colorant layer 34 (and material from primer layer 36 if present) from panel 24 and retain these dislodged portions on sealable surface 22 of container 10. Since masking material 32 possesses low adhesion properties to the material of translucent or transparent panel 24, differential adhesion will occur, with portions of colorant layer 34 being dislodged, as determined by the indicia-defining pattern defined by masking material 32.

Figure 4:
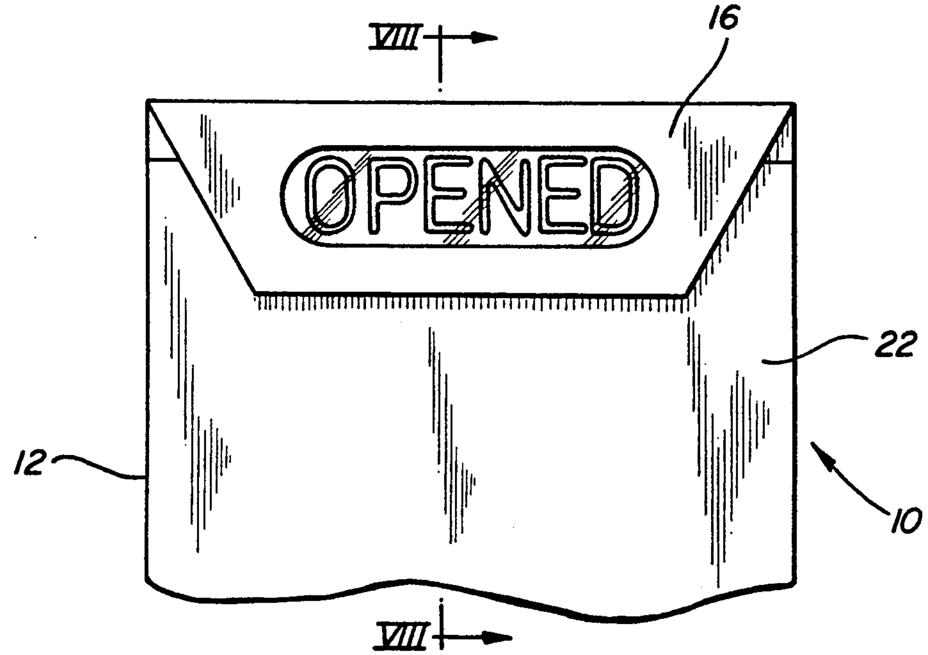
FIG. 4 is a partial plan view of the envelope shown in FIG. 3 which has been resealed after being opened.
Figure 5:
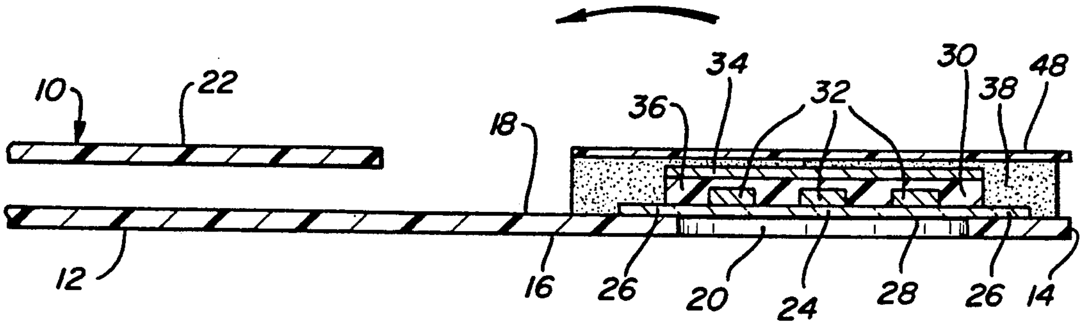
FIG. 5 is a vertical section view taken along line V—V of FIG. 1.
Figure 8:
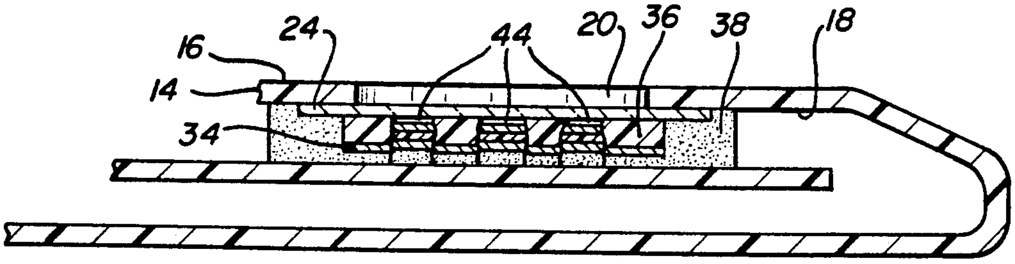
FIG. 8 is a vertical section view taken along line VIII—VIII of FIG. 4.

The masking material, colorant, and any primer are applied wet to panel 24 so as to develop an interface more intimate than that which would result from dry application of the same components to panel 24. Consequently, attempted resealing after opening as shown in FIGS. 7 and 8, will not achieve the same interface and air spaces, shown generally as 44 in FIG. 8, will remain between colorant layer 34 and panel 24 in the indicia-defining pattern previously defined by masking material 32, thereby creating a color differential. The generation of these air spaces is also facilitated by the fact that dislodgement of the composite in the areas of the masking material does not produce a completely even boundary so that upon attempted resealing, the dislodged composite portions 40 will not fully complement voids 42 in the composite remaining on panel 24. The colorant layer 34 can comprise multiple layers, preferably laminated together, of more than one contrasting color to emphasize the voids. Thus the indicia will be irreversibly displayed through window 24, as shown in FIG. 4.

In the embodiment shown in FIGS. 5-8, adhesive 38 can be of the pressure sensitive type. A release strip 48 (shown in FIG. 5) of a material having a low affinity for the adhesive can be affixed to the adhesive to protect the same prior to sealing, the release strip being removed without disturbing the underlying composite and discarded when the envelope or container is to be sealed.

The adhesive layer 38 can be made of an adhesive composition such as acrylic-based adhesives which optionally contain microencapsulated dye. The dislodged portion 40 adheres to the sealable surface 22 at adhesive layer 38. Any attempt to rub of f, or erase the dislodged portion will cause the capsules containing the dye to rupture and release the dye. The dye will discolor the sealable surface 22 evidencing tampering. Preferably the dye in the encapsulated dye is a matching color to colorant layer 34.

Figure 9:
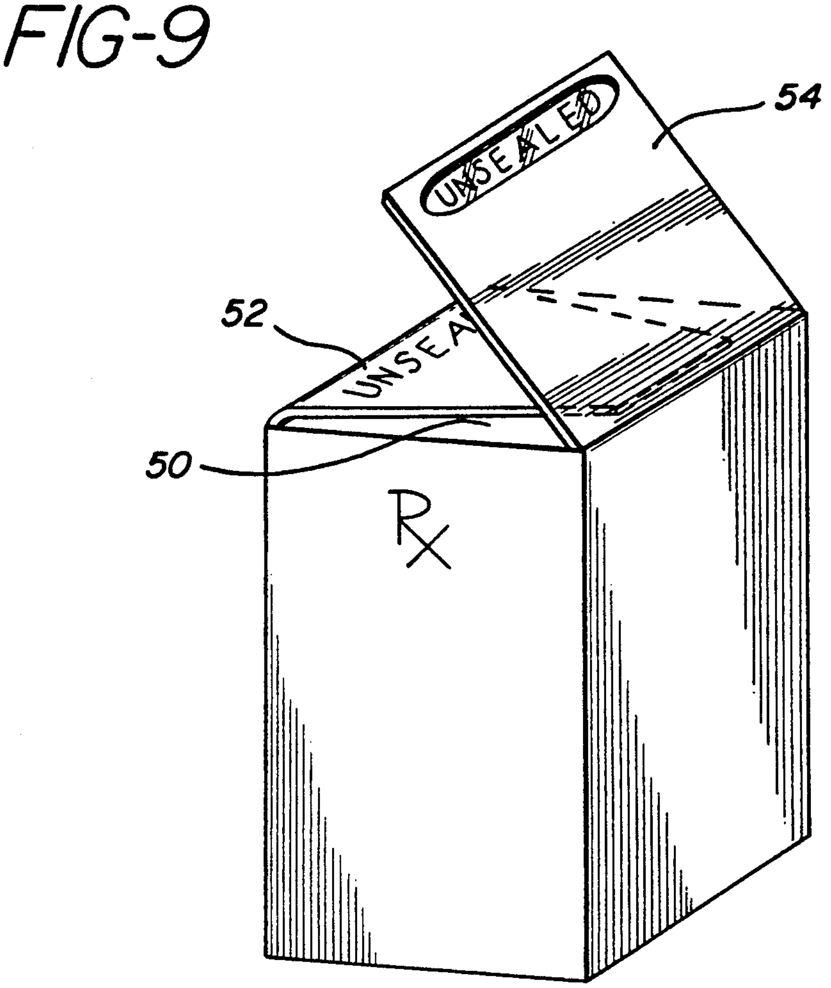
FIG. 9 is a perspective view of a further embodiment in which the container is a packaging box.
Figure 10:
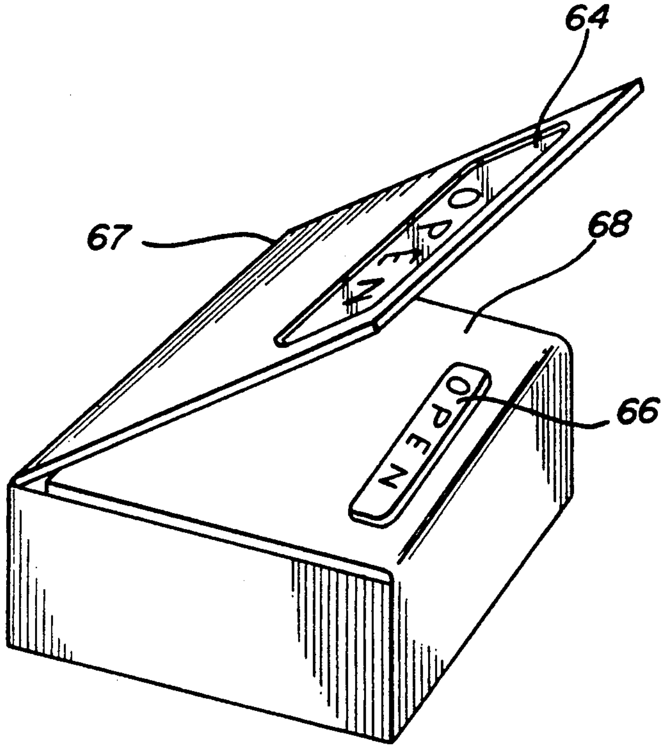
FIG. 10 is a perspective view of a further embodiment in which the container is a corrugated carton.

FIG. 9 depicts a further embodiment in which the tamper indicating composite is incorporated in a packaging box. In such an embodiment, which is shown as having been opened after having been sealed (analogous to FIG. 7), the container is sealed by the manufacturer or distributor prior to sale and adhesives other than those of the pressure sensitive type can be used, as for example acrylics, water base glues, two-part latex, etc., with appropriate selection of the colorant, masking material, and primer, if any. Since there may be several closure flaps 50, 52 and 54, the window is placed on that flap 54 having an exposed outer surface relative to the container. The contiguous flap 52 then becomes the sealable inner surface.

A totally analogous structure can be used for corrugated cartons. Where, however, it is desired to provide additional rigidity to the closure flap prior to sealing, the embodiment of FIG. 10 can be employed. Thus translucent or transparent panel 64 is affixed to the outside of the closure flap 67 in which die-cut slug 66 has been defined as by a knife-cut. In addition to the adhesive between the panel and the outside surface of the flap, a second layer of adhesive (not shown) will be applied between the inner surface of the flap and the sealing surface of the container, such as inner panel 68. Prior to sealing, slug 66 provides additional strength to panel 64. Upon sealing panel 64, including slug 66, to inner panel 68 through the second adhesive and thereafter opening the container, slug 66 will remain on panel 68 with the tamper indicating indicia being displayed thereon.

Figure 11:
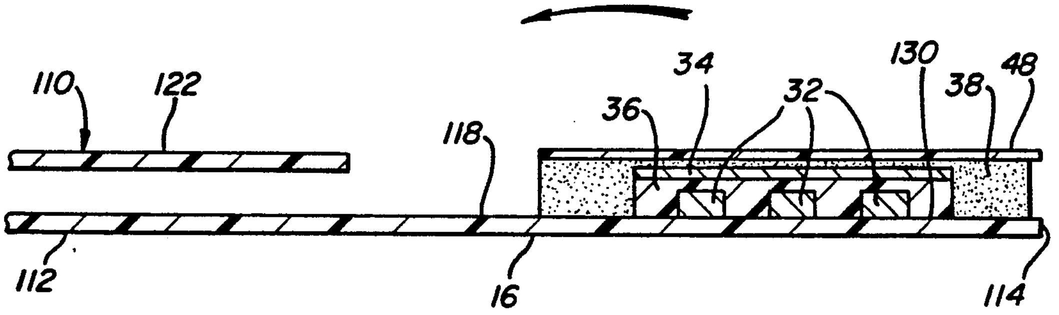
FIG. 11 is an alternate embodiment of the present invention.
Figure 12:
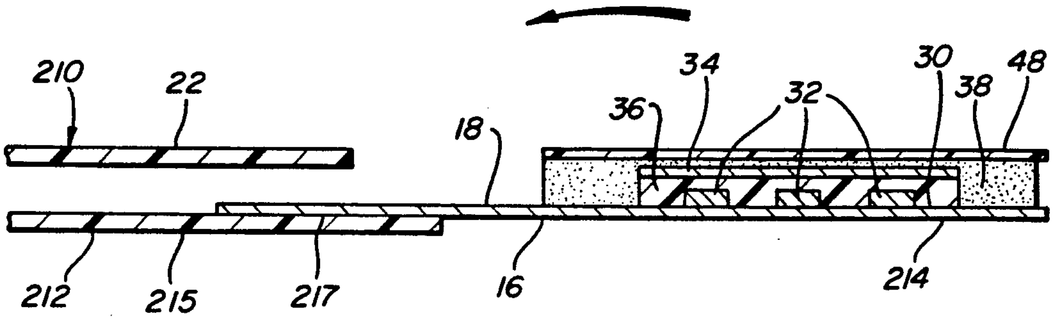
FIG. 12 is a further embodiment of the present invention.

Additional embodiments of the invention are illustrated in FIGS. 11-12. These figures correspond to FIG. 5. Elements which are the same have the same reference characters and reference is made to the corresponding description.

FIG. 11 is directed to a generally transparent or translucent container 110. The container is preferably made of a polymeric material, preferably a thermoplastic polymeric material. Preferred materials are polymer film or sheet made of: polyolefins such as polyethylene, ethylene vinyl acetate copolymers, ethylene acrylic acid copolymers; polypropylene; acrylic polymers; vinyl polymers such as polyvinyl fluoride, polyvinyl chloride, and the like; cellulose acetate; polycarbonates; polyesters; polyethanes; polysulfones; styrene polymers, and the like. Useful films and sheets are from 0.0015 to 0.5 inches and preferably from 0.001 to 0.05 inches thick. Preferred film is from 0.001 to 0.01 inches thick and preferred sheet is from 0.01 to 0.25 inches thick.

The body portion 112 and closure 114 are both transparent or translucent and preferably integrally connected as one unit. There is an indicia defining pattern disposed on the inner surface 130 of closure 114. Preferably, the indicia defining pattern extends across the full width of closure 114 parallel to opening between sealable surface 122 and sealable inner surface 118.

In this embodiment, the whole closure 114 seals the container 110. The indicia forming defining pattern directly adheres to closure 114. Since the closure 114 itself is translucent or transparent, there is no need for a separate panel 24, as in the embodiment of FIGS. 5 and 6.

FIG. 12 is a further embodiment in which container 210 has a separate opaque body portion 212 with a separate transparent or translucent closure 214. The closure is attached to the body. In the embodiment illustrated, the closure 214 is attached to the body 212 along a closure side 217 of the container. The closure can be attached by a suitable means, such at adhesive at the interface 217 between the closure side 217 and closure 214. Preferably the closure can be laminated as an additional layer onto the closure side 217. It can be located inside or outside of the container 210. The closure 214 can be made of materials and thicknesses of the type used in the embodiment shown in FIG. 11.

Reference is made to FIGS. 13–16 which illustrate a further embodiment of the present invention in the form of a seal which is generally shown as reference character 100. Although embodiments incorporating tamper indicating means have the advantage of eliminating the need for separate labels or tape, the present invention has resulted in an improved seal. The seal 100 contains corresponding elements to the embodiment illustrated in FIGS. 5-8 and operates in a corresponding way. Upon being used, there is no indication that the seal will permanently indicate when it has been lifted from the article to be sealed. When the seal is opened, there is a permanent indication that it has been opened.

The seal comprises a substrate 124 which has an outer surface 128 and an inner surface 130. Substrate 124 can utilize materials similar to those employed for panel 24. Preferably, substrate 124 is made of a flexible, translucent polymeric film or sheet. Useful polymers for substrate 124, as well as panel 24, include but are not limited to self-supporting films made of polyethylene; ethylene vinyl acetate copolymers; ethylene acrylic acid copolymers, and the like; propylene based polymers; acrylic polymers; vinyl polymers such as polyvinyl fluoride, polyvinyl chloride, and the like; cellulose acetate; polycarbonates; polyesters; polyethers; polysulfones; styrene polymers. Substrate 124 is typically from 0.0005 to 0.5 in., preferably from 0.001 to 0.05 inches thick. Depending on the article to be sealed,, substrate 124 can be made of flexible polymer film preferably from 0.001 to 0.01 in. Polymer sheet is preferably 0.01 to 0.25 inches thick. The thickness and material of the substrate can be varied depending upon the article to be sealed.

Disposed in an indicia-defining pattern on inner surface 130 of panel 124 is substantially transparent masking material 132. Masking material 132 possesses low adhesion properties to the material of substrate 124. It can be made of the same type of material used to make masking material 32, and can be applied by the same process.

A colorant layer 134 is disposed on inner surface 130 of substrate 124 over and extending beyond the indicia-defining pattern defined by masking material 132. The colorant layer can be the same type of material as colorant layer 34. The colorant layer 134 preferably extends over substantially all, and more preferably over the whole area of the substrate 124.

Optionally, a primer layer 136 is disposed between masking material 132 and colorant layer 134 in an area at least coextensive with the area in which colorant layer 134 is disposed. Primer layer 136 facilitates adhesion of colorant layer 134 to substrate 124 in those areas in which masking material 132 is not present. When the colorant material has a high affinity for the material of substrate 124, primer layer 136 is not needed and can be eliminated.

Adhesive 138 is disposed over at least a portion and preferably over the whole area in which colorant layer 134 and transparent masking material 132 are disposed.

Figure 15:
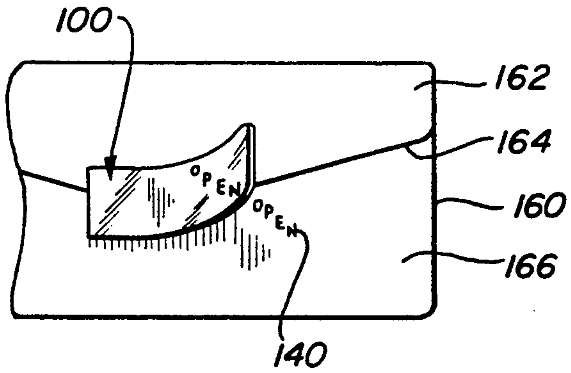
FIG. 15 illustrates a seal partially removed from an envelope.

The adhesive 138 is operable first to seal the article to be sealed. For example, FIG. 15 illustrates a conventional envelope 160 having a closure flap 162. A closure edge 164 is defined where the flap 162 meets the body 166 of the envelope 160. The seal 100 can be used to seal the envelope at closure edge 164.

Upon subsequent unsealing of seal 100 as shown in FIG. 15, the substrate 124 is lifted away from the article such as envelope 160. The colorant 134, and optionally primer layer 136, have relatively greater adhesion to substrate 124 than to adhesive layer 138 and the adhesive layer 138 to the article,, such as envelope 160, which is being sealed. Therefore, upon lifting the substrate layer 124, unmasked colorant layer 134 adheres to and is removed with the substrate 124. Portions 140 of the composite including colorant layer 134 (and material from primer layer 136 if present) continue to adhere to the article such as envelope 160, which is sealed. Since masking material 132 possesses low adhesion properties to the material of translucent substrate 124, differential adhesion will occur, with portions of colorant layer 134 being dislodged, as determined by the indicia-defining pattern defined by masking material 132. This residual portion 140 can be adhered to the article to be sealed indicating the article was tampered with.

As in the embodiment shown in FIGS. 5–8, adhesive 138 can be any suitable adhesive. It can be a water activated adhesive. Preferably the adhesive is a pressure sensitive type. When a pressure sensitive type of adhesive is used, a release type carrier web is useful to support the seal. The release carrier web supports the seal in contact with the adhesive layer 138. Release web 150 of a material has a low affinity for the adhesive and can be affixed to the adhesive to protect the same prior to sealing, the release strip being removed with substantially no disturbance of the adhesive layer and the underlying composite.

The adhesive layer 138 is made of adhesive composition which optionally contains encapsulated dye. The dislodged portion 140 adheres to a sealable surface such as an envelope 160 at adhesive layer 138. Any attempt to rub off, or erase the dislodged portion will cause the capsules containing the dye to rupture and release the dye. The dye will discolor the sealable surface evidencing tampering. Preferably the dye in the encapsulated dye is a matching color to colorant layer 34.

The seal 100 has a colorant 134 applied so that the transparent masking material is not apparent when the seal is applied to an article such as envelope 160 shown in FIG. 12. It is only when the seal is separated from the article that the indicia formed by the masking material 132 become irreversibly apparent. The colorant in the colorant layer between the substrate 124 and the adhesive layer 138 preferentially adheres to the substrate layer 124 rather than the article, except where there is transparent masking material 132. The colorant adheres to the article such as envelope 160 rather than the substrate layer 124 because of the relatively low adhesion level between the colorant layer 134 and the masking layer 132 compared to the colorant and the adhesive layer 138 which itself adheres to the article, i.e. envelope 160.

The seal itself can be in any suitable form depending upon the article to be sealed. The seal can be in noncontinuous shapes useful for specific articles to be sealed. Useful shapes are squares or rectangles such as shown as seals 100 in FIG. 12. Here the seal 100 is on a carrier web or strip such as carrier strip 150. Carrier strip 150 is adjacent to and releasably adheres to adhesive layer 138. The seal 100 is easily removed from carrier strip 150 with substantially no disturbance to adhesive layer 138 or to the seal 100. Preferably, there is no disturbance to the adhesive layer or the seal by removal from the carrier strip.

Figure 2:
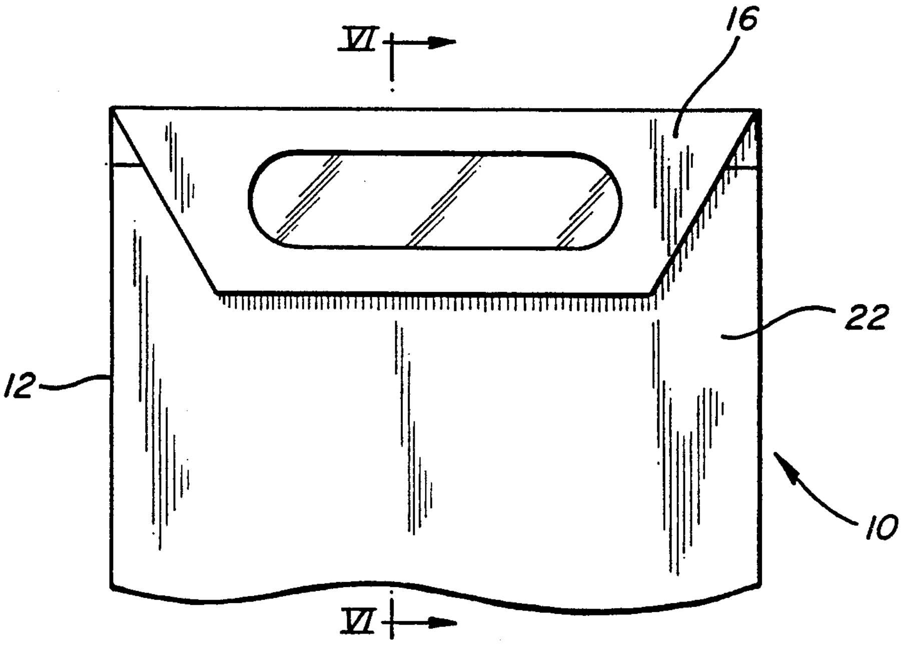
FIG. 2 is a partial plan view of the envelope shown in FIG. 1 in its sealed configuration.
Figure 3:
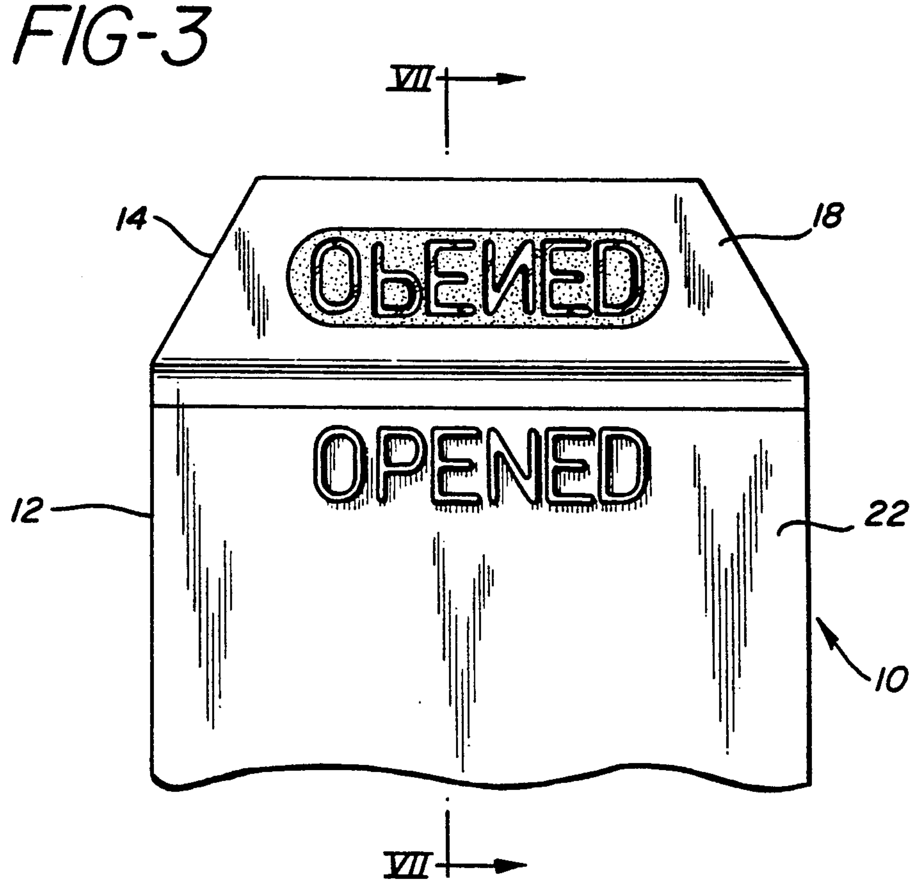
FIG. 3 is a partial plan view of the envelope shown in FIG. 2 which, however, has been opened after being sealed.

FIG. 15 illustrates rectangular shaped seal 100 being used to seal envelope 160. The flap 162 is folded to close envelope 160. The f lap can adhere to the body 166 of the envelope such as shown in FIGS. 1 AND 2. A seal 100 is placed over closure sealing edge 164 where the edge of the flap 162 meets the body of the envelope. The tamper evidencing indicia 140 resulting from the masking material 132 is not apparent. Upon separating of the seal 100 from the envelope, the adhesive 138 adheres to the envelope where it was not lifted from the envelope by preferentially adhering to substrate 124. The colorant 134 remains adhered to the envelope as evidence that the seal was removed.

Figure 14:
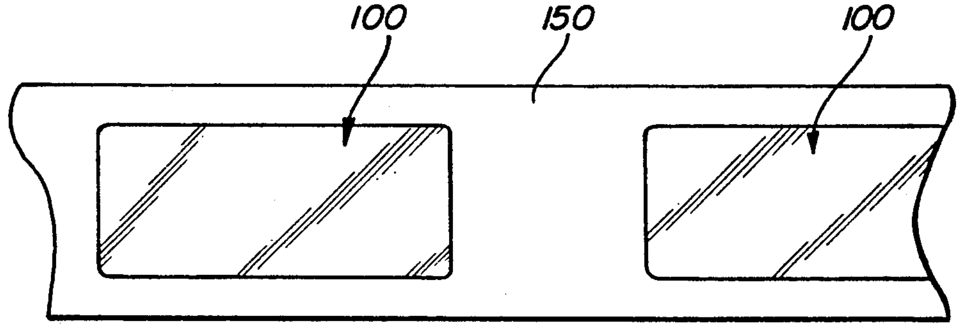
FIG. 14 is a plan view of an embodiment of the seal of the present invention, where the seal is noncontinuous and is on a continuous carrier strip.

The noncontinuous seal embodiment illustrated in FIGS. 14 and 15 is shown in a preferable and useful rectangular shape. It is recognized that other shapes can be used depending upon the article and for ornamental design. Useful shapes include squares, rectangles, circles and ornamental shapes such as letters, numbers, trademarks, and the like.

Figure 16:
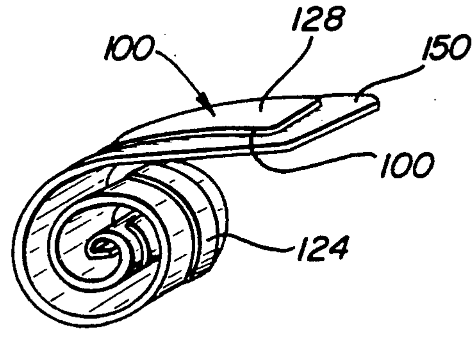
FIG. 16 is a side view, schematically illustrating a continuous seal strip in a roll.

In an alternate embodiment, the seal 100 can be continuous such as a continuous strip or tape as illustrated in FIG. 16. The tape can have a carrier web such as carrier strip 150 in FIG. 14 except that seal 100 is a continuous strip. The substrate 124 can be made of a material which has an outer surface 128 which has sufficiently low adhesion to the adhesive layer 138 to enable the continuous seal to be rolled with the adhesive layer adjacent to the outer surface 128 so that the strip can be unrolled with substantially no disturbance to the adhesive layer and the seal.

Figure 17:
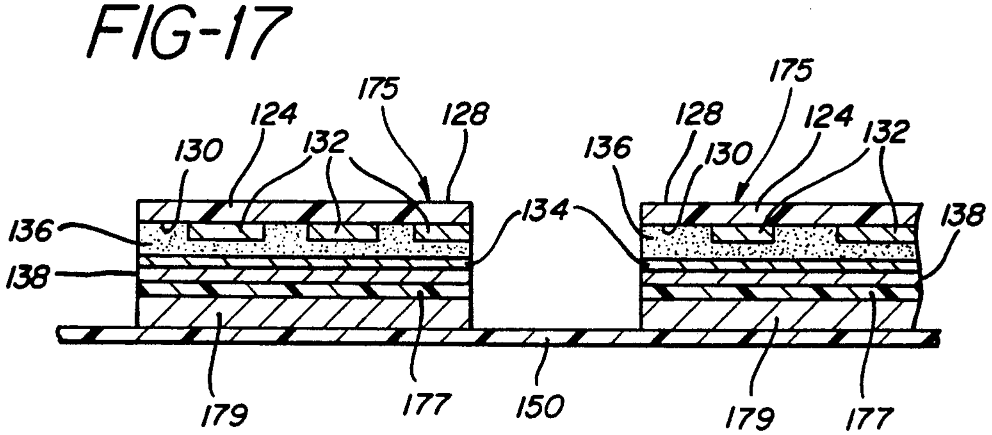
FIG. 17 is an alternate embodiment of the seal of the present invention.

FIG. 17 is an alternate embodiment of the seal of the present invention. The seal 175 is useful to seal containers having rough surface including fibrous and corrugated surfaces.

Figure 13:
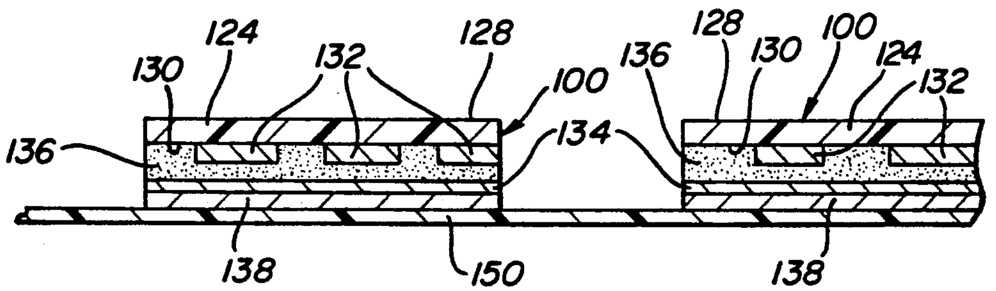
FIG. 13 is a sectional view of the seal of the present invention.

The seal 175 in FIG. 17 has common reference characters for common elements as the seal illustrated in FIG. 13. There additionally is a barrier layer 177 adjacent to the adhesive layer 138 on the side of the adhesive layer 138 opposite the colorant layer 134.

There is a strong adhesive layer 179 adjacent to the barrier layer 177 on the side of the barrier layer opposite the adhesive layer 138.

The barrier layer 177 is thereby located between adhesive layer 138 and strong adhesive layer 179. The barrier layer 177 has relatively greater adhesion to the strong adhesive layer 179 than to the adhesive layer 138. The strong adhesive layer 179 can be supported on release web 150.

In operation, release web 150 is removed revealing strong adhesive layer 179. Strong adhesive layer 179 is placed on a surf ace to be sealed. If the seal is tampered with the substrate layer 124 is lifted away from the surface of the sealed article. The composite of the colorant 134, optionally primer layer 136 and adhesive layer 138, have relatively greater adhesion to each other and to substrate 124 than to the barrier layer 177. Upon lifting substrate 124, unmasked colorant layer 134 adheres to and is removed with substrate 124. Portions of the composite which were masked including colorant layer 134 (a material from primer layer 136 if present) continue to adhere to the barrier layer 177.

The barrier layer 177 preferentially adheres to the strong adhesive layer 139 rather than being lifted with adhesive layer 138 when the substrate 134 is lifted. This leaves behind a desired indicia formed by the masking materials 132.

The strong adhesion can be a suitable adhesive such as acrylic based adhesives, so long as it sealingly adheres to the rough surface and has greater adhesion to the rough surface to be sealed and barrier layer 177 than adhesive layer 138 has to the barrier layer 177.

The barrier layer can be a polymer-based coating up to 0.1 inches thick, preferably up to 0.01 inches thick. Alternatively, it can be a layer of self-supporting polymer film, or multilayered laminate, foil, paper or the like. The requirement of the barrier layer is that it have greater adhesion to the strong adhesive layer 179 than to the adhesive layer 138. In effect, the combination of strong adhesive layer 179 and barrier layer 177 provides a base on rough surfaces for the seal of the present invention.

Preferably, barrier layer 177 is brittle, and more preferably, more brittle than adhesive layer 179. Any attempt to remove the seal 175 would result in the barrier layer breaking into small pieces. This construction enables the seal to be applied to rough surfaces.

In a further embodiment, the seal can be incorporated between opposing, sealingly connected walls of a sealed container. Typically, opposing walls can be connected by adhesives or heat. The tamper indicating seal is located in the sealingly connected area. Once the sealed area is separated dislodged portions of the seal will evidence opening.

Figure 18:
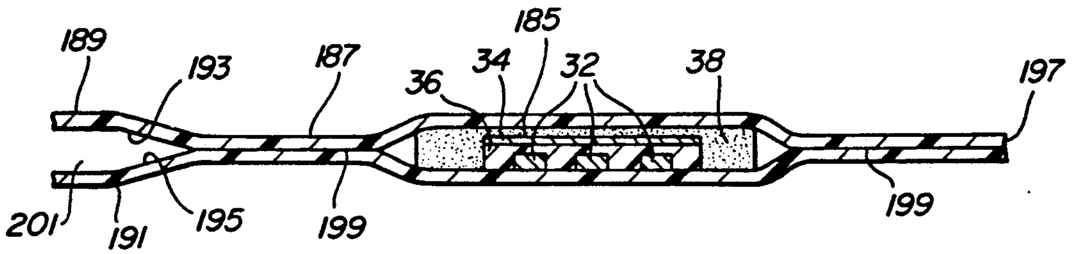
FIG. 18 is a sectional view of a further embodiment of the invention.
Figure 19:
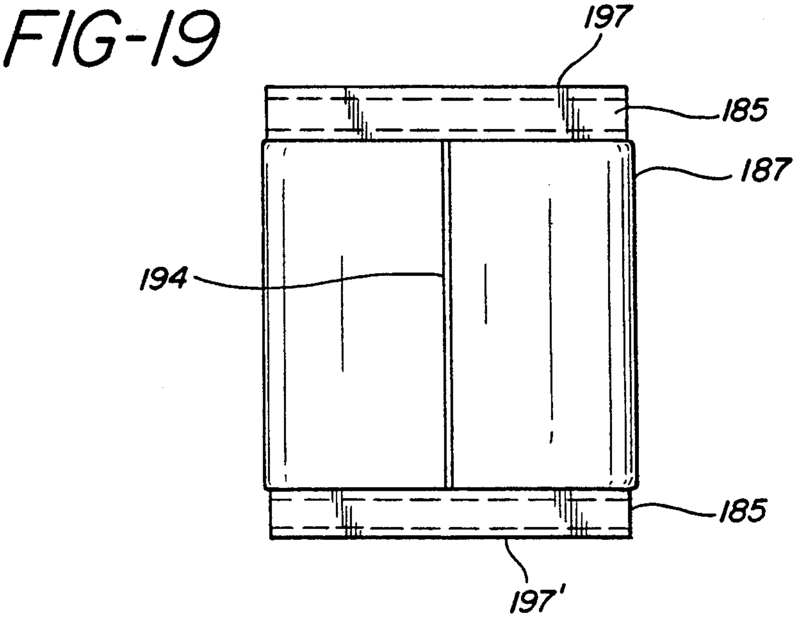
FIG. 19 is a plan view of a container utilizing the seal of FIG. 18.

Typical embodiments are illustrated in FIGS. 18 and 19. Seal 185 is located in the sealingly connected area of opposing connected walls of a film bag 187 such as used with snacks, potato chips, pretzels etc. Seal 185 contains elements corresponding to the embodiment illustrated in FIGS. 5–8 and operates in a corresponding way. Corresponding elements have the same reference characters.

Bag 187 typically is constructed from one or more layers of polymeric material, with opposing walls 189 and 191 having inner surfaces 193 and 195, respectively. Such bags have at least one sealed end and typically opposite sealed ends 197'. One such end 197 is shown in FIG. 18. The bag can be a tubular extrusion or have a seam 194 extending longitudinally from end to end. The inner surfaces 193 and 195 are closed at or near the end 197. The inner surfaces 193 and 195 at the end 197 are connected by a suitable adhesive, or in the case of thermoplastic film, heat sealed to sealingly enclose an enclosed volume 201. The walls 189 and 191 are connected at end 197 along a common area 199 to define enclosed volume 201. The adhesive layer 38 can be the same adhesive as the adhesive used to seal the opposing connected walls.

The seal 185 of the present invention can be located between walls 189 and 191 in the common area 199. Preferably, the seal extends along the full length of the common area 199, parallel to sealed end 197. Separation of connected walls 189 and 191 at the seal 187 will cause the seal to be broken leaving indicia forming dislodged portions such as dislodged portions 40 shown in FIG. 7.

Figure 20:
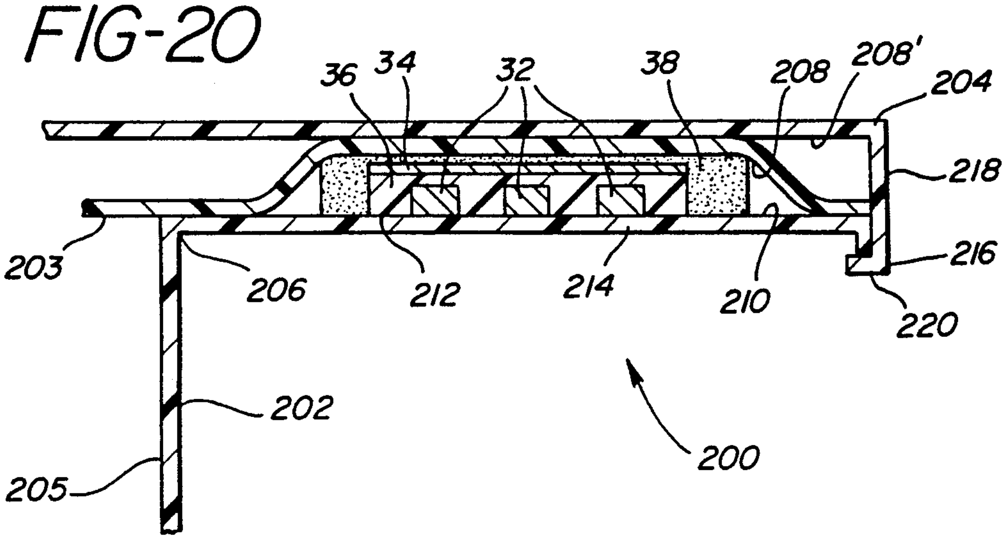
FIG. 20 is a sectional view of another embodiment of the present invention.

The present invention includes a further embodiment illustrated in FIG. 20 in which the seal can be located at the interface of a container and a closure for the container. Container 200 comprises a main receptacle 202 and a closure 203. In the embodiment shown in FIG. 20, the closure is a liner layer which can be a thin film or film laminate layer 203. Receptacle 202 optionally can be additionally covered by lid 204. Receptacle 202 has a wall 205 and a lip area 206 at the edge of the wall 205. The closure 203 and lip area 206 of the receptacle have corresponding opposing surfaces, such as closure opposing surface 208 and lip opposing surface 210. Seal 212 of the present invention is located between opposing surfaces 208 and 210. Seal 212 contains elements corresponding to the embodiment illustrated in FIGS. 5–8 and operates in a corresponding way. Corresponding elements have the same reference characters. Closure 203 and receptacle 202 are sealingly connected at opposing surfaces 208 and 210. The seal 212 can be used to connect surfaces 208 and 210, and/or surfaces 208 and 210 can be connected by the use of an adhesive and/or by heat sealing the two surfaces in such a manner so as to perform the same. function as adhesive element 38.

In an alternate embodiment, the container of FIG. 20 has no liner and the seal 212 is located between, and in contact with, lip area 206 and lid 204. Preferably there are flat, opposing lip surface 210 and opposing lid surface 208'. The lid 204 has a shape corresponding to the shape of receptacle 202. The lip 206 has a flat lip extension 214 extending radially from the wall 205 of receptacle 202. The lid 204 extends to the outer edge of lip extension 214 and has a lip interlock means such as extension 218 which extends generally axially from the lid 204 toward the receptacle 202. There can be a locking ridge 220 at the end of extension 218. The locking ridge generally extends radially toward the receptacle. The outer edge of lip extension 214 is interlocked between surface 208', extension 218 and ridge 220 when the receptacle 202 is closed with the lid 204.

The receptacle 202 is sealed with seal 212 being at .between at least part of opposing surfaces 208 (or 208') and 210. When the lid is removed the seal will be broken leaving indicium formed by dislodged portion such as dislodged portion 40 drawn in FIG. 7.

While exemplary embodiments of the invention have been described, the scope of the invention is to be determined from the following claims.

What is claimed is:

1. A seal comprising:

(a) a transparent or translucent substrate sheet having an outer surface and an inner surface;

(b) a layer of adhesive on the inner surface of the substrate sheet; and (c) tamper indicating means disposed between the inner surface of the substrate sheet and the layer of adhesive, the tamper indicating means comprising:

(i) a transparent masking material disposed on the inner surface of the substrate sheet in indicia-defining pattern; and (ii) a layer of at least one colorant extending beyond the indicia-defining pattern of the masking material, said masking material where present reducing the strength of the bond between the colorant and the substrate sheet to below the strength of the bond between the colorant and the adhesive; whereby upon attempted removal of the seal from a surface to which it has been applied, said colorant is dislodged from the substrate sheet within the area defined by the masking material to create a permanent but previously nonevident tamper indicating indicia visible through the transparent or translucent substrate sheet and corresponding to the area defined by the masking material.

2. The seal according to claim 1 wherein a primer layer operable to facilitate adhesion of said colorant to said substrate sheet is disposed between said transparent masking material and said colorant layer, said primer layer being disposed in an area at least coextensive with the area in which said colorant layer is disposed.

3. The seal according to claim 1 wherein the adhesive is a pressure sensitive adhesive.

4. The seal according to claim 1 wherein the seal is in the form of noncontinuous shapes.

5. The seal according to claim 4 in the shape selected from the group consisting of squares, rectangles, circles or ornamental shapes.

6. The seal according to claim 1 having a releasable carrier web over and adjacent to the adhesive layer, the release carrier web having a sufficiently low adhesion to the adhesive layer to enable the carrier web to be removed from the adhesive layer with substantially no disruption to the adhesive layer or seal.

7. The seal according to claim 1 wherein the seal is a continuous strip.

8. The seal according to claim 1 wherein the colorant layer is substantially coextensive with the area of the substrate including the area of the masking material.

9. A seal comprising a transparent or translucent polymeric substrate sheet having a non-sealable outer surface and a sealable inner surface, said sealable inner surface having:

(a) a transparent masking material disposed in an indicia-defining pattern thereon;

(b) a colorant layer disposed on the inner surface of the substrate sheet over the transparent masking material and extending beyond the indicia-defining pattern of the masking material;

(c) a first adhesive disposed over at least the area in which said colorant layer and transparent masking material are disposed;

(d) a barrier layer disposed over the first adhesive layer opposite the colorant layer; and '(e) a second adhesive layer disposed over the barrier layer opposite the first adhesive layer, the second adhesive layer having greater adhesion than the first adhesive layer to the barrier layer;

said masking material where present reducing the strength of the bond between the colorant and the substrate sheet to below the strength of the bond between the colorant and the first adhesive; whereby upon attempted removal of the seal from a surface to which it has been applied, said colorant is dislodged from the substrate sheet within the area defined by the masking material to create a permanent but previously nonevident tamper indicating indicia visible through the transparent or translucent substrate sheet and corresponding to the area defined by the masking material.

10. The seal according to claim 9 having a releasable carrier web over and adjacent to the adhesive layer, the release carrier web having a sufficiently low adhesion to the adhesive layer to enable the carrier web to be removed from the adhesive layer with substantially no disruption to the adhesive layer or seal.

* * * * *